United States Patent
Truong et al.

(10) Patent No.: US 7,843,366 B2
(45) Date of Patent: Nov. 30, 2010

(54) DVD EFM MODULATION ARCHITECTURE USING TWO PASSES TO REDUCE CIRCUIT SIZE

(75) Inventors: Huan T. Truong, San Jose, CA (US); Cheng Qian, San Jose, CA (US); Rajesh Juluri, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1512 days.

(21) Appl. No.: 11/200,671

(22) Filed: Aug. 10, 2005

(65) Prior Publication Data

US 2007/0036513 A1 Feb. 15, 2007

(51) Int. Cl.
*H03M 5/00* (2006.01)
(52) U.S. Cl. .............................. 341/58; 341/59; 341/68
(58) Field of Classification Search .................... 341/58, 341/59, 68, 69
See application file for complete search history.

(56) References Cited

U.S. PATENT DOCUMENTS

| | | | | |
|---|---|---|---|---|
| 5,151,699 A * | 9/1992 | Moriyama | .................. | 341/58 |
| 6,023,234 A * | 2/2000 | Fukuoka | .................. | 341/58 |
| 6,778,104 B2 * | 8/2004 | Chen et al. | .................. | 341/59 |
| 6,879,637 B1 * | 4/2005 | Nakagawa et al. | .................. | 375/253 |
| 6,950,042 B2 * | 9/2005 | Nakagawa et al. | .................. | 341/58 |
| 7,030,788 B2 * | 4/2006 | Aida et al. | .................. | 341/59 |

* cited by examiner

*Primary Examiner*—Khai M Nguyen
(74) *Attorney, Agent, or Firm*—Christopher P. Maiorana, PC (57) ABSTRACT

A method for modulating a video input signal received into a modulation circuit is disclosed. A first step of the method generally comprises (A) during a first modulation pass, generating (i) a primary frame by inserting a plurality of primary synchronization codes into the video input signal, (ii) a secondary frame by inserting a plurality of secondary synchronization codes into the video input signal, (iii) a plurality of first values and a first digital sum value both for the primary frame and (iv) a plurality of second values and a second digital sum value both for the secondary frame. A second step of the method generally comprises (B) during a second modulation pass, generating a video output signal presented from the modulation circuit by modulating the video input signal using one set of (i) the first values and (ii) the second values as determined by the first digital sum value relative to the second digital sum value.

20 Claims, 10 Drawing Sheets

SYNC CODE TABLE II

| | STATE 1 AND STATE 2 | | STATE 3 AND STATE 4 | |
|---|---|---|---|---|
| | PRIMARY SYNC CODE | SECONDARY SYNC CODE | PRIMARY SYNC CODE | SECONDARY SYNC CODE |
| SY0 | 0001001001000100 0000000000010001 | 0001001000000100 0000000000000001 | 1001001000000100 0000000000010001 | 1001001001000100 0000000000010001 |
| SY1 | 0000010000000100 0000000000010001 | 0000010001000100 0000000000000001 | 1000010001000100 0000000000010001 | 1000010000000100 0000000000010001 |
| SY2 | 0001000000000100 0000000000010001 | 0001000001000100 0000000000000001 | 1001000001000100 0000000000010001 | 1001000000000100 0000000000010001 |
| SY3 | 0000100000000100 0000000000010001 | 0000100001000100 0000000000000001 | 1000100001000100 0000000000010001 | 1000100000000100 0000000000010001 |
| SY4 | 0010000000000100 0000000000010001 | 0010000001000100 0000000000000001 | 1010000001000100 0000000000010001 | 1010000000000100 0000000000010001 |
| SY5 | 0010010001000100 0000000000010001 | 0010010000000100 0000000000000001 | 1010010000000100 0000000000010001 | 1010010001000100 0000000000010001 |
| SY6 | 0010100100000100 0000000000010001 | 0010100000000100 0000000000000001 | 1010100000000100 0000000000010001 | 1010100100000100 0000000000010001 |
| SY7 | 0010010100010100 0000000000010001 | 0010010100000100 0000000000000001 | 1010010100000100 0000000000010001 | 1010010100010100 0000000000010001 |

DVD EFM MODULATION ARCHITECTURE USING TWO PASSES TO REDUCE CIRCUIT SIZE

FIELD OF THE INVENTION

The present invention relates to a digital video modulation generally and, more particularly, to a DVD EFM modulation architecture using two passes to reduce a circuit size.

BACKGROUND OF THE INVENTION

A digital video signal recorded to a digital versatile disks (DVD) disk commonly uses eight-to-sixteen modulation (EFM) in converting data bytes of the digital video signal into a bitstream suitable for the DVD disk. The modulation controls a digital sum value (DSV) of the bitstream to make a modulated code either DC-free or at least small. Conventionally, two bitstreams are generated from input data in the digital video signal during the EFM process. A stream 1 has primary synchronization codes and a 16-bit codeword for each of the 91 bytes in the input data. A stream 2 includes secondary synchronization codes and a 16-bit codeword for each of the bytes in the input data. The stream having a smaller DSV value is selected as the final modulated bitstream.

Since the final selection of either the stream 1 or the stream 2 is unknown until modulation has completed, a conventional EFM modulation circuit stores both streams simultaneously. Saving the two full bitstreams in the EFM circuit utilizes 2 streams×16 bits per codeword×91 codewords per stream=2880 bits of register or memory space. Storing the 2880 bits uses a considerable amount of silicon area.

SUMMARY OF THE INVENTION

The present invention concerns a method for modulating a video input signal received into a modulation circuit. A first step of the method generally comprises (A) during a first modulation pass, generating (i) a primary frame by inserting a plurality of primary synchronization codes into the video input signal, (ii) a secondary frame by inserting a plurality of secondary synchronization codes into the video input signal, (iii) a plurality of first values and a first digital sum value both for the primary frame and (iv) a plurality of second values and a second digital sum value both for the secondary frame. A second step of the method generally comprises (B) during a second modulation pass, generating a video output signal presented from the modulation circuit by modulating the video input signal using one set of (i) the first values and (ii) the second values as determined by the first digital sum value relative to the second digital sum value.

The objects, features and advantages of the present invention include providing a DVD EFM modulation architecture using two passes to reduce a circuit size that may (i) use less silicon area than conventional approaches, (ii) may provide real-time modulation using two passes through the input data and/or (iii) generate an output signal compatible with conventional demodulation approaches.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
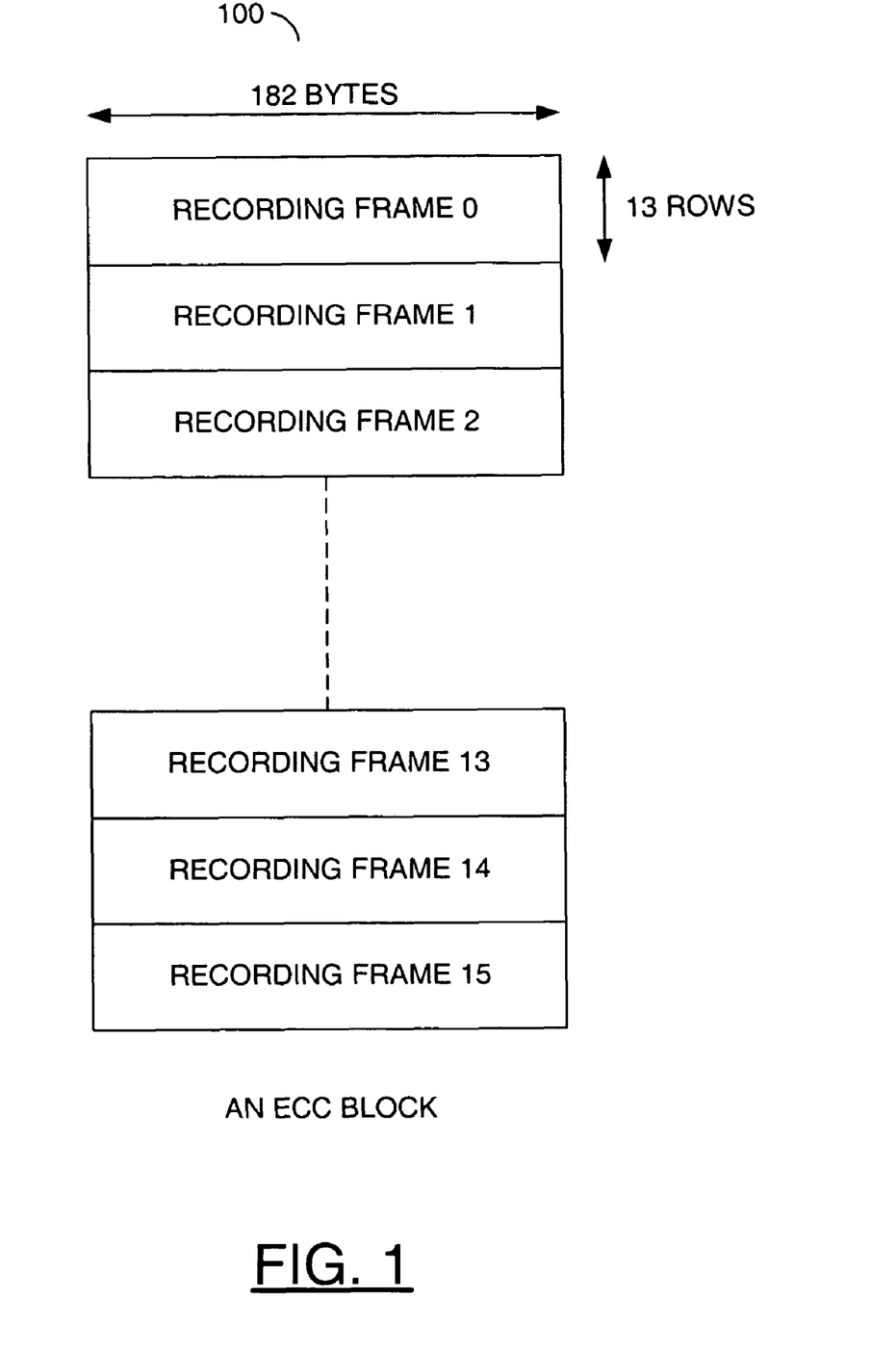
FIG. 1 is a block diagram of an example error correction code block of video data.

Referring to FIG. 1, a block diagram of an example error correction code (ECC) block 100 of video data is shown. Each ECC block 100 generally comprises multiple recording frames (e.g., RECORDING FRAME 0-RECORDING FRAME 15). The recording frames may be generically referred to as a RECORDING FRAME. Each RECORDING FRAME generally comprises multiple (e.g., 13) rows of data with multiple (e.g., 182) bytes per row. Modulation of the ECC block 100 generally involves converting from a recording frame format to a physical sector format.

Figure 2:
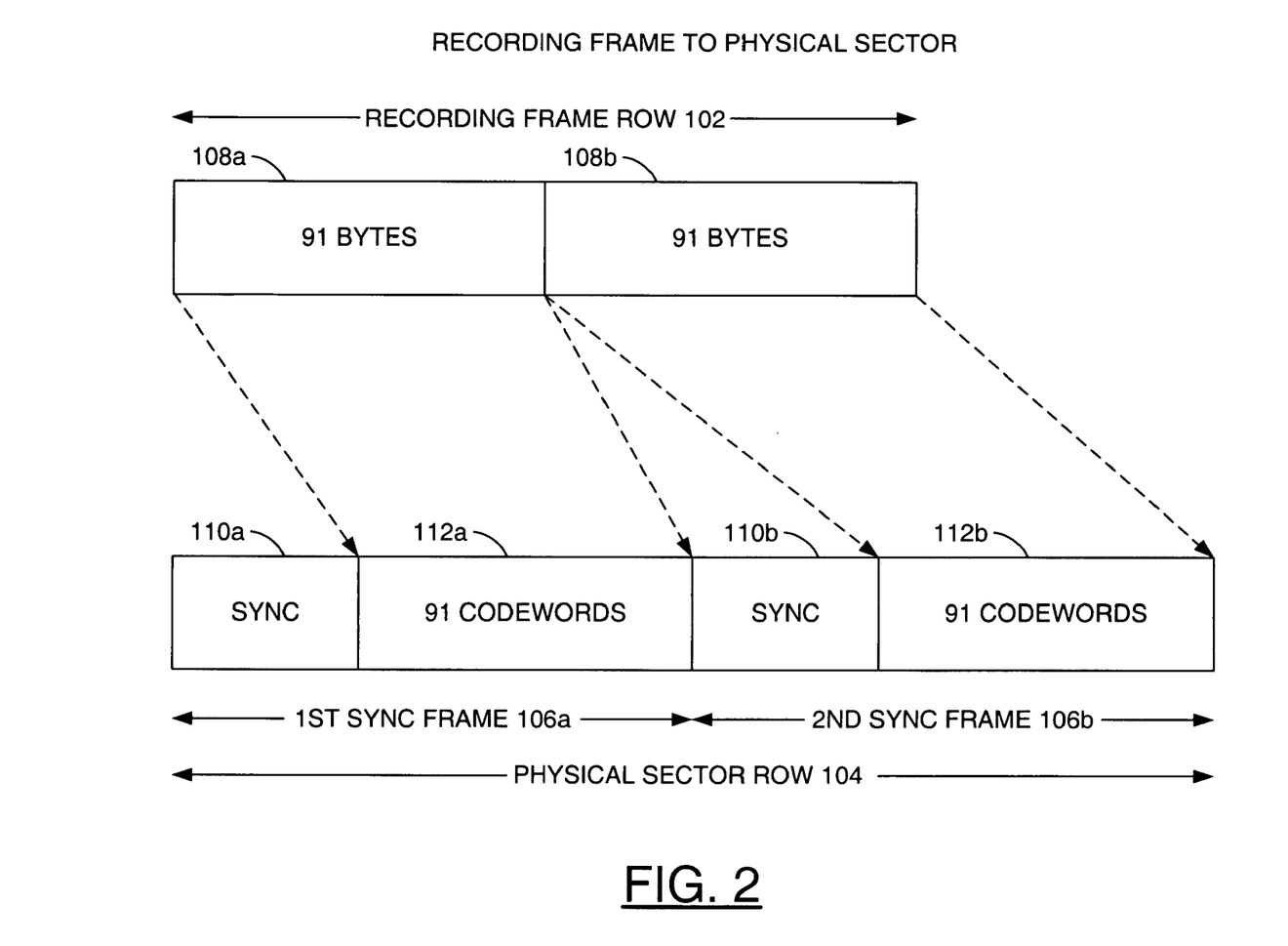
FIG. 2 is a diagram of an example conversion of a recording frame row to a physical sector row.

Referring to FIG. 2, a diagram of an example conversion of a recording frame row 102 to a physical sector row 104 is shown. The recording frame row 102 may be representative of any of the rows in any of the RECORDING FRAMES. The physical sector row 104 generally comprises multiple (e.g., 2) frames 106a-106b. The frames 106a-106b may each be referred to as a synchronization (sync) frame.

Conversion from the recording frame row 102 to the physical sector row 104 may be performed on a subset of the recording frame row 102 at a time. For example, a first portion 108a of the recording frame row 102 may be converted into the first synchronization frame 106a. A second portion 108b of the recording frame row 102 may be converted into the second synchronization frame 106b. The conversion may include adding a respective synchronization code 110a-110b to a beginning of each synchronization frame 106a-106b. As illustrated, 91-bytes subsets 108a and 108b may be converted into 91 16-bit codewords 112a and 112b respectively.

A physical sector frame generally comprises a same number of rows (e.g., 13) as the ECC block 100 from which created. Each row of the physical sector frame generally has a unique collection of synchronization codes (e.g., SY0-SY7). TABLE I generally illustrates assignments of the synchronization codes SY0-SY7 to each of the synchronization frame rows as follows:

TABLE I

| | |
|---|---|
| SY0 | 1st Sync Frame |
| SY1 | 1st Sync Frame |
| SY2 | 1st Sync Frame |
| SY3 | 1st Sync Frame |
| SY4 | 1st Sync Frame |
| SY1 | 1st Sync Frame |
| SY2 | 1st Sync Frame |

TABLE I-continued

| | |
|---|---|
| SY3 | 1st Sync Frame |
| SY4 | 1st Sync Frame |
| SY1 | 1st Sync Frame |
| SY2 | 1st Sync Frame |
| SY3 | 1st Sync Frame |
| SY4 | 1st Sync Frame |
| SY5 | 2nd Sync Frame |
| SY5 | 2nd Sync Frame |
| SY5 | 2nd Sync Frame |
| SY5 | 2nd Sync Frame |
| SY5 | 2nd Sync Frame |
| SY6 | 2nd Sync Frame |
| SY6 | 2nd Sync Frame |
| SY6 | 2nd Sync Frame |
| SY6 | 2nd Sync Frame |
| SY7 | 2nd Sync Frame |
| SY7 | 2nd Sync Frame |
| SY7 | 2nd Sync Frame |
| SY7 | 2nd Sync Frame |

In particular, each row of the physical sector frame may have a single synchronization code from among the codes SY0-SY4 and a single synchronization code from among the codes SY5-SY7. Therefore, the various pairings of synchronization codes are uniquely associated with individual rows.

Figure 3:
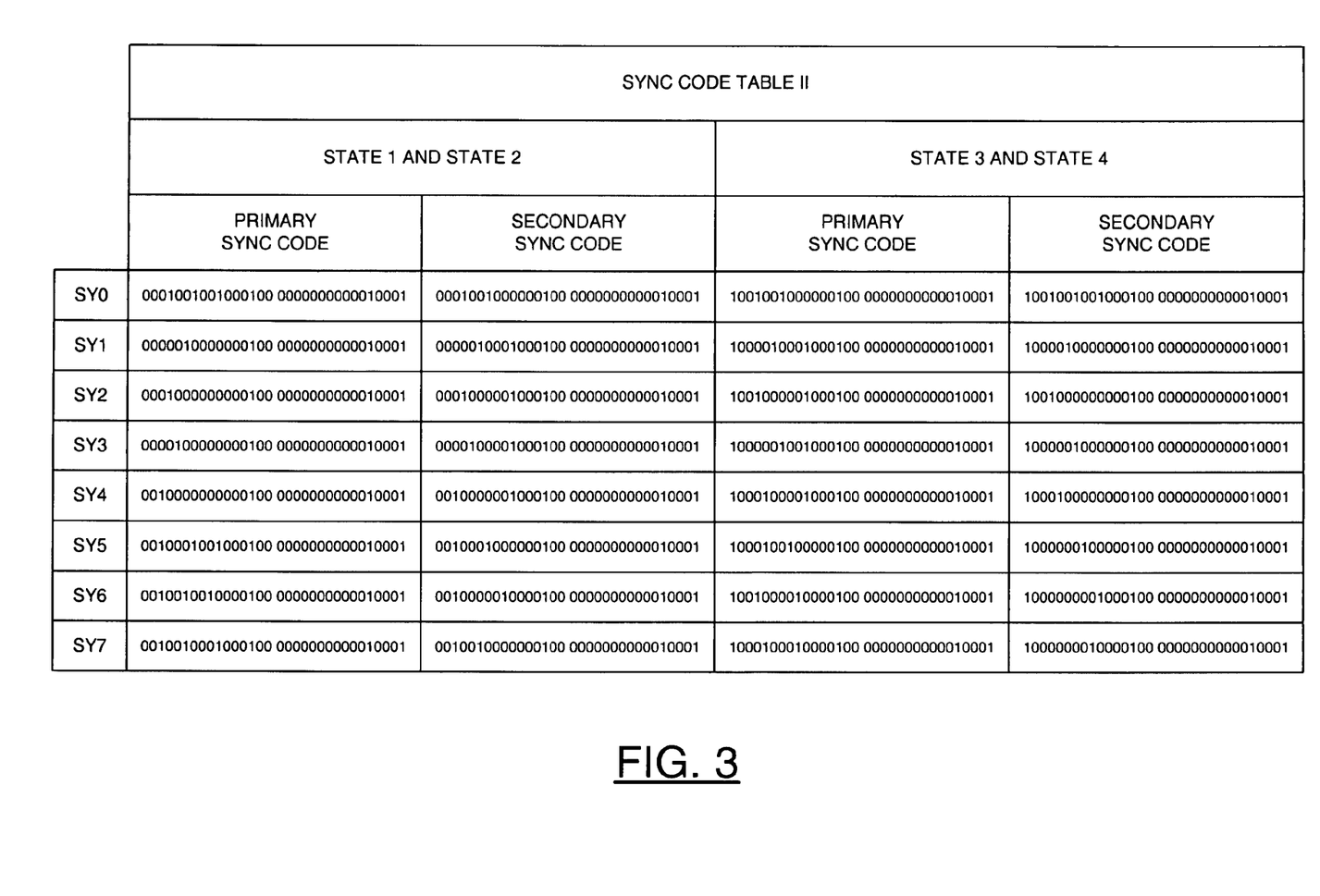
FIG. 3 is a TABLE II of synchronization code patterns used in multiple states of a modulation process.

Referring to FIG. 3, a TABLE II of synchronization code patterns used in multiple states of a modulation process is shown. Each of the synchronization codes SY0-SY7 may be represented as multiple (e.g., 4) unique patterns of logical ones and logical zeros. Each pattern generally depends upon a state (e.g., STATE 1-STATE 4) of the modulation process and if the code is being used as a primary synchronization code or a secondary synchronization code. The synchronization code patterns may be 32-bit patterns.

Figure 4:
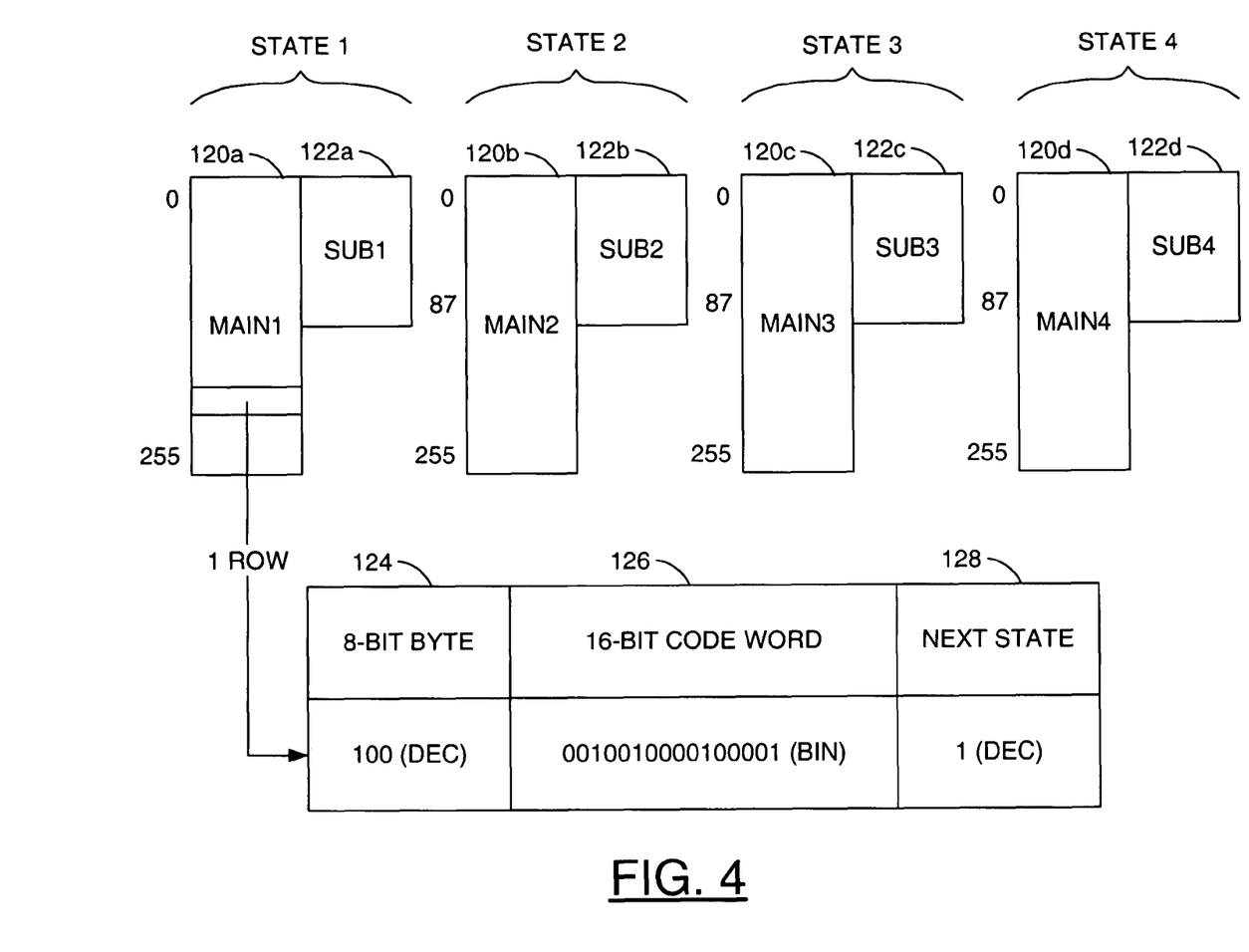
FIG. 4 is a block diagram of example conversion tables.

Referring to FIG. 4, a block diagram of example conversion tables 120a-120d and 122a-122d are shown. The conversion tables 120a-120d and 122a-122d may be divided into multiple groups, a group for each of STATE 1-STATE 4. Each group generally comprises two of the tables, a table from among tables 120a-120d and a corresponding table from among tables 122a-122d. Half of the tables (e.g., 120a-120d) may be referred to as main conversion tables. The other half of the tables (e.g., 122a-122d) may be referred to as substitution conversion tables.

The main conversion tables 120a-120d generally provide a unique codeword for converting every possible value of a data unit (e.g., a byte) from the received video information. For example; each of the main conversion tables 120a-120d may store 256 codewords, a codeword for each of the 256 possible values in a byte of the video information.

The substitution conversion tables 122a-122d generally provide a unique codeword for converting some (e.g., 0-87) of every possible value of the data units. For example, each of the substitution conversion tables 122a-122d may store 88 codewords, a codeword for each of the 88 possible lowest values in a byte of the video information (e.g., values that start with a binary zero).

Each entry in the conversion tables 120a-120d and 122a-122d generally comprises a field 124, a field 126 and a field 128. The field 124 may be an 8-bit field storing an input value (e.g., 100 decimal) to be converted. The field 126 may be a 16-bit field storing a codeword to which the input value is converted. The field 128 may be a 2-bit field storing a next state value (e.g., 1 decimal) for the next valid state of the modulation process.

Figure 5:
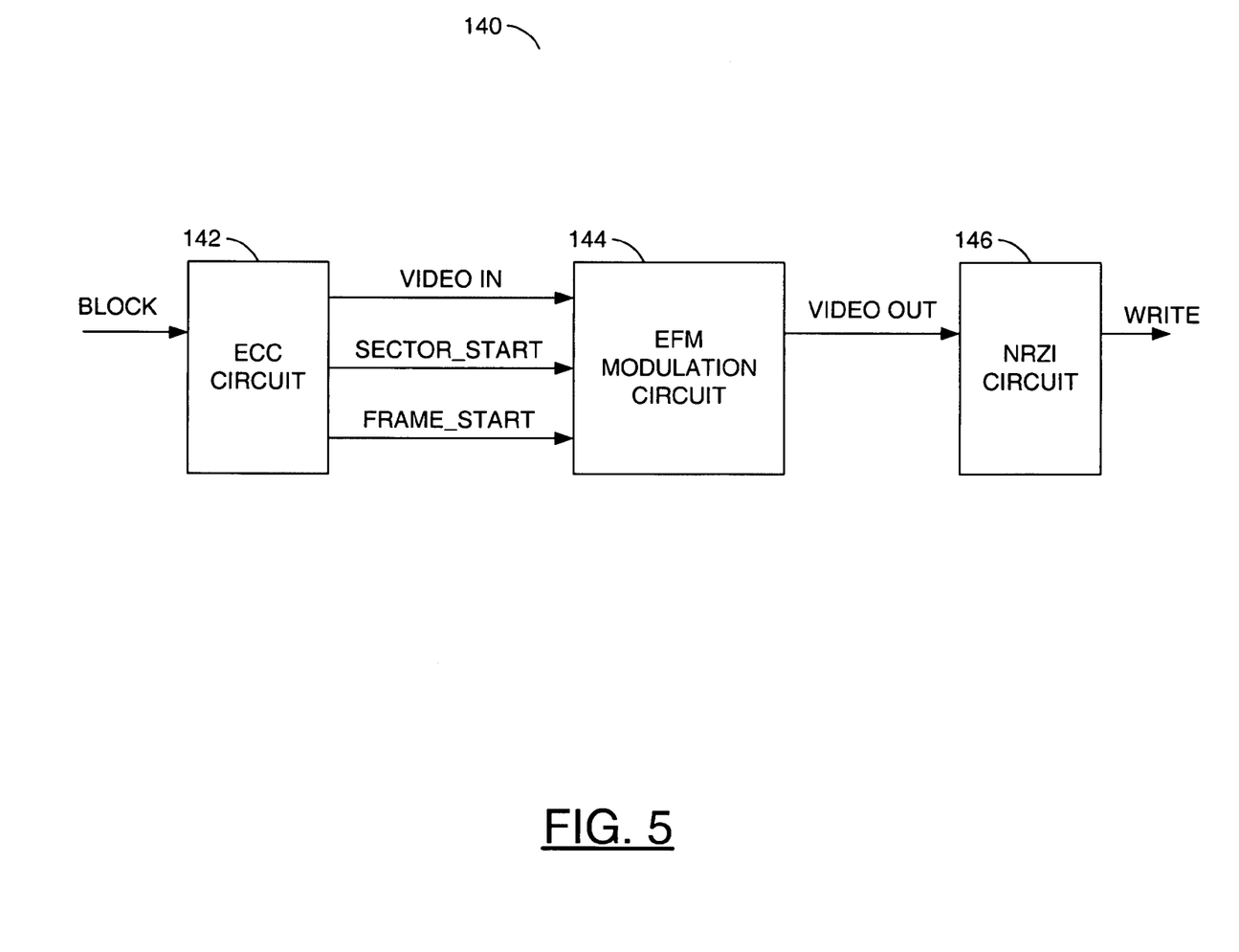
FIG. 5 is a block diagram of a portion of a system in accordance with a preferred embodiment of the present invention.

Referring to FIG. 5, a block diagram of a portion of a system 140 is shown in accordance with a preferred embodiment of the present invention. The system (or apparatus) 140 may include a circuit (or module) 142, a circuit (or module) 144 and a circuit (or module) 146. A signal (e.g., BLOCK) may be received by the circuit 142. A signal (e.g., WRITE) may be presented by the circuit 146. A signal (e.g., VIDEO IN) may be presented from the circuit 142 to the circuit 144. A signal (e.g., SECTOR_START) may be presented from the circuit 142 to the circuit 144. A signal (e.g., FRAME_START) may also be presented from the circuit 142 to the circuit 144. A signal (e.g., VIDEO OUT) may be presented from the circuit 144 to the circuit 146.

The circuit 142 may be referred to as an error correction coding (ECC) circuit. The ECC circuit 142 may be operational to perform a forward error correction coding on a block of video data received in the signal BLOCK. The error corrected block of data may be an ECC block 100, as shown in FIG. 1. The ECC block 100 may be transferred to the circuit 144 in the signal VIDEO IN.

The circuit 144 may be referred to as an eight-to-sixteen (EFM) modulation circuit. The EFM modulation circuit 144 may be operational to modulate the ECC block 100 received in the signal VIDEO IN to generate a physical sector block. The physical sector block may be transferred from the EFM modulation circuit 144 to the circuit 146 in the signal VIDEO OUT.

The EFM modulation circuit 144 generally implements an architecture that makes multiple (e.g., two) passes through the ECC block 100. A start of the first modulation pass may be indicated by the ECC circuit 142 via a sector start pulse in an asserted state (e.g., a logical high) in the signal SECTOR_START. The ECC circuit 142 may then transfer a current ECC block 100, one recording frame at a time, to the EFM modulation circuit 144. Synchronization of the recording frames may be provided via a series of synchronization pulses in the asserted state (e.g., the logical high) in the signal FRAME_START, one synchronisation pulse per frame. To indicate a start to a second modulation pass, the ECC circuit 142 may represent the sector start pulse in the asserted state in the signal SECTOR_START. The ECC circuit 142 may then resend the same current ECC block 100 (optionally along with a next ECC block) in the signal VIDEO IN. Synchronization of the recording frames may again be provided by the synchronization pulses in the signal FRAME_START.

The circuit 146 may be referred to as a NRZI circuit. The NRZI circuit 146 may be operational to perform a non-return to zero inverted conversion of the data in the signal VIDEO OUT to generate the signal WRITE. The signal WRITE may be in a format suitable for writing a pattern of marks (e.g., pits) and spaces (e.g., non-pits or land) that may be useful for optical sensing from the DVD disk.

The EFM architecture of the system 140 generally uses a two-pass design. Instead of saving 16-bit codewords for each byte of data received in the signal VIDEO IN, the EFM modulation circuit 144 may save fewer bits (e.g., 3 bits) per byte of received data in the form of pointers. Each of the 3-bit pointers may identify a conversion table 120a-120d and 122a-122d holding a particular codeword assigned to a respective byte of data as determined during the first modulation pass. At the end of the first pass, the EFM modulation circuit 144 may determine which of two sets of pointers provides a better modulation of the ECC block 100. The determination may be based on a lowest magnitude between two digital sum values (DSV) calculated during the first pass. During the second modulation pass, the EFM modulation circuit 144 may use the better pointer set to modulate (e.g., insert the synchronization codes and replace bytes with codewords) the ECC block 100 to generate a physical sector block.

The physical sector block may then be transferred to the NRZI circuit 146 in the signal VIDEO OUT. An advantage of the present invention may be that the EFM modulation circuit 144 does not have to hold all 91 codewords in each of two the possible streams when determining the better modulation scheme. Instead the EFM modulation circuit 144 may store only 3 bits per byte. A resulting memory (or register) savings may be an approximately (16−3)/16=81% reduction. The memory reduction may provide an overall reduction in the silicon area utilized in a physical layout of the EFM modulation circuit 144. The EFM modulation circuit 144 may take advantage of an internal memory buffer capability within the ECC circuit 142 to achieve the reduced size. The memory buffer inside the ECC circuit 142 may be a unified memory access design.

A bitstream in the signal VIDEO OUT may have several properties such that when recorded on the DVD disk, the pattern of marks and spaces may be easily read through optical means. In particular, the pattern of logical ones and logical zeros in the signal VIDEO OUT should be arranged to have a minimum of two logical zeros and a maximum of ten logical zeros between any two logical ones. Furthermore, a magnitude of an accumulated DSV value of the recorded bitstream should be minimized or reduced to zero, if possible. Furthermore, the distance (e.g., time) between logical transitions in the recorded bitstream should be not too large or too small to be able to reconstruct a clock embedded in the bitstream.

A DSV value may be calculated by incrementing for each bit, both logical ones and logical zeros, starting with an original-direction logical transition (e.g., one-to-zero or zero-to-one) and ending at an opposite-direction logical transition (e.g., zero-to-one or one-to-zero). The DSV may then be decremented for each bit, both logical ones and logical zeros, starting from the opposite-direction logical transition and ending at a subsequent original-direction logical transition. Incrementing and decrementing may be repeated between each pair of transitions until the end of a synchronization frame (e.g., 106b) is reached. For example, the DSV value may be incremented between a first logical transition and an opposite second logical transition, decremented between the second logical transition and a third logical transition, incremented between the third logical transition and a fourth logical transition, etc.

The magnitude of the DSV value (e.g., |DSV|) for the signal VIDEO OUT may be minimized by controlling a use of synchronization codes SY0-SY7 and 16-bit codewords in modulating the signal VIDEO IN. For each synchronization code SY0-SY7 and each state (e.g., STATE 1-STATE 4), two synchronization options generally exist between either a primary synchronization code or a secondary synchronization code (see FIG. 3). For each data byte received in the signal VIDEO IN having a value between 0 and 87 and each state (e.g., STATE 1-STATE 4), two codeword replacement options may exist between either a main conversion table 120a-120d or a substitution conversion table 122a-122d. For each data byte having a value in a range of 88 to 255, if the state is STATE 1 or STATE 4 and if a run length criteria is met, two codeword replacement options may exist between either the STATE 1 main conversion table 120a or the STATE 4 main conversion table 120d.

Figure 6:
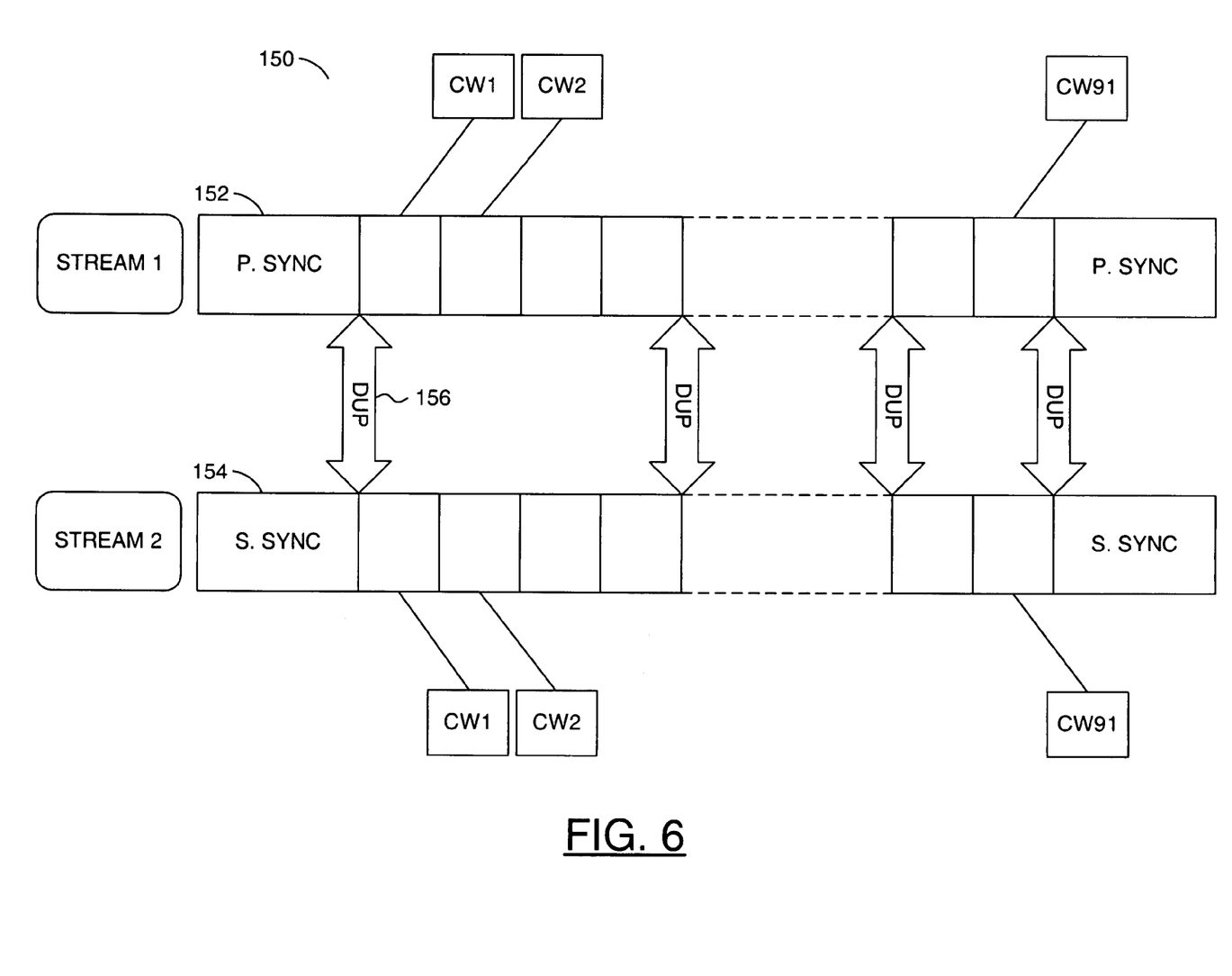
FIG. 6 is a diagram of an example first modulation pass.

Referring to FIG. 6, a diagram 150 of an example first modulation pass is shown. The EFM modulation generally starts at the beginning of a RECORDING FRAME. Two streams (e.g., STREAM 1 and STREAM 2) may be generated by the EFM modulation circuit 144 during the first modulation pass. A primary synchronization code 152 may be inserted at a start of the STREAM 1 (e.g., primary stream). A secondary synchronization code 154 may be inserted at a start of the STREAM 2 (e.g., secondary stream).

If the next data byte from the portion of the recording frame row 102 being modulated has a value in the range of 0 to 87, the stream with lower |DSV| may be selected and the associated codeword duplicated 156 to the higher |DSV| stream. The codeword of the next data byte from an appropriate main conversion table 120a-120d is entered into the STREAM 1 and the codeword from an appropriate substitution conversion table 122a-122d is entered into the STREAM 2. If the next data byte from the portion of the recording frame row 102 being modulated has a value in the range of 88 to 255 and if the prescribed state for both streams is STATE 1 or STATE 4, the stream with a lower |DSV| is selected and the associated codeword may be duplicated 156 to the higher |DSV| stream. The 3-bit pointers determined for the codewords may be saved to the respective pointer sets.

For the stream with lower |DSV|, the codeword of the next data byte from the prescribed state (e.g., STATE 1 or STATE 4) may be entered into the lower |DSV| stream. For the higher |DSV| stream, if a run length criteria is met, the codeword from STATE 4 or STATE 1 may be entered into the higher |DSV| stream. Otherwise, the higher |DSV| stream may use the same codeword as the lower |DSV| stream. The 3-bit pointers for the codewords used may be saved to the respective pointer sets.

If the next data byte have a value of in the range 88 to 255 and if the prescribed state of only a single stream is either STATE 1 or STATE 4, the following process may be applied. If the STATE 1/4 stream has the lower |DSV|, the next codeword for the STATE 1/4 stream may be duplicated to the STATE 2/3 stream. The codeword of the next data byte from the prescribed state (e.g., STATE 1 or STATE 4) may be entered into the STATE 1/4 stream. For the STATE 2/3 stream, if a run length criteria is met, the codeword from STATE 4 or STATE 1 may be entered into the STATE 2/3 stream. Otherwise, the STATE 2/3 stream may use the same codeword as the STATE 1/4 stream. If the STATE 1/4 stream has a larger |DSV| than the STATE 2/3 stream, the STATE 1/4 stream may use the codeword from the appropriate prescribed state and the STATE 2/3 stream may use the codeword from the appropriate prescribed state. The pointers for the codewords used may be saved to the respective pointer sets.

If the next data byte have a value in the range of 88 to 255 and if the prescribed state of both streams is either STATE 2 or STATE 3, each stream may use the codeword from the associated prescribed state. The pointers determined for the codewords may be saved to the respective pointer sets.

At the end of the synchronization frame, the |DSV| of both streams may be compared. The stream with smaller |DSV| is generally determined to have a better modulation. During the second modulation pass, each pointer in the pointer set from the better modulation may be used to identify an appropriate conversion table for transforming the respective byte into a 16-bit codeword. The resulting synchronization frame stream may be presented to the NRZI circuit 146 in the signal VIDEO OUT.

After the second modulation pass has completed, the ECC circuit 142 may signal the ECM modulation circuit 144 for a start to a next portion of the recording frame. The first pass modulation process may begin again with the next primary synchronization code inserted into the new STREAM 1 and the next secondary synchronization code inserted into the new STREAM 2. A second modulation pass may then be performed to present another synchronization frame to the NRZI circuit 146. The modulation process generally repeats with each sequential 91 bytes of the recording frame 102.

If the codewords for both streams are saved directly in the EFM modulation circuit 144, as in a conventional design, then 2×91=182 16-bit registers (e.g., 2912 bits) are implemented to store the information. In the present invention, the ECC circuit 142 may buffer the 91 bytes of recording frame data and send the data twice to the EFM modulation circuit 144. In the first pass, the tables used for the encoding the data in the two streams may be saved in 2×91=182 3-bit registers (e.g., 546 bits). At the end of a first modulation pass, a decision may be made to select a pointer set/register set for a single stream. In the second pass, the codewords may be read from the conversion tables as specified by the better pointer set/register set. The present invention may save (2×16×91−02×03×91)/(2×16×91)=2366/291.2=81.25% of memory used to identify the better stream.

Figure 7:
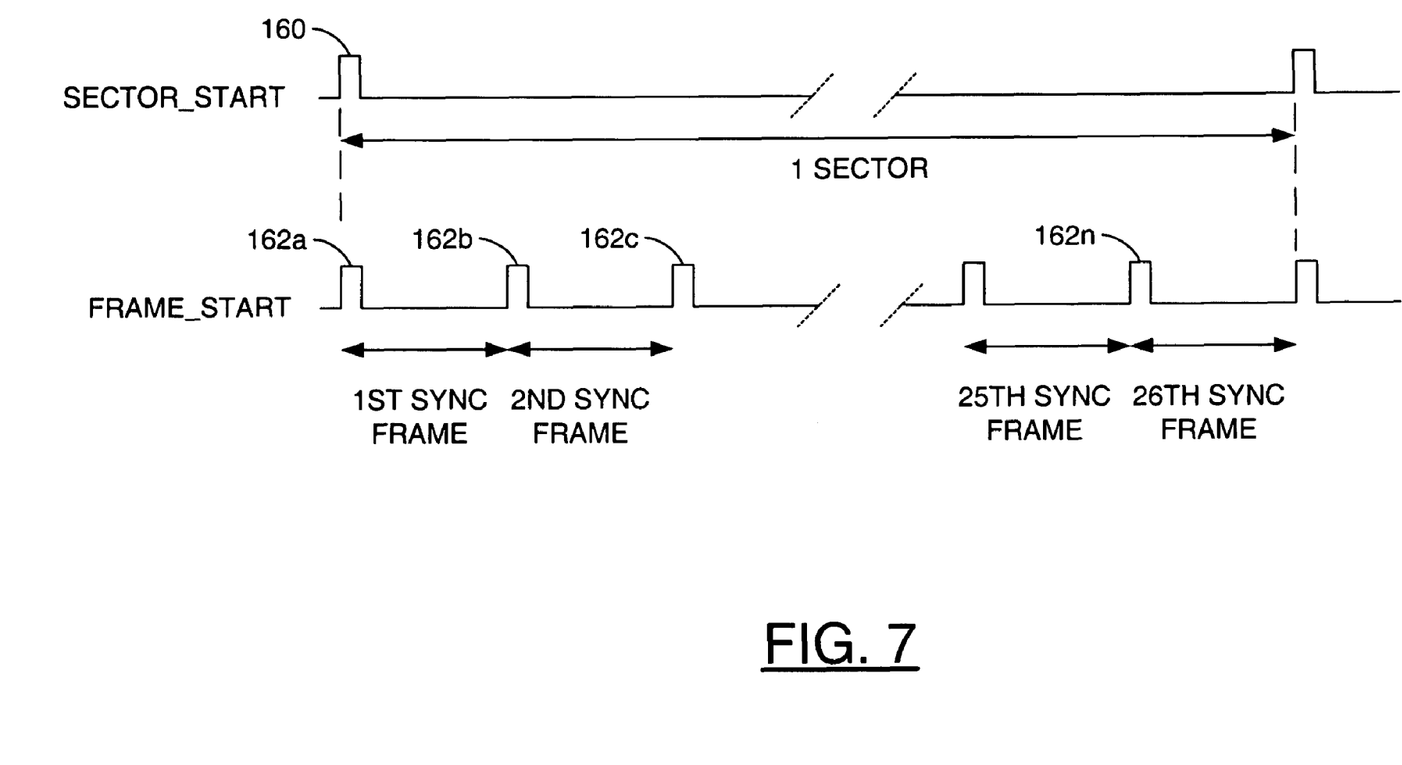
FIG. 7 is a diagram of example waveforms for a sector synchronization signal and a frame synchronization signal.

Referring to FIG. 7, a diagram of example waveforms for the signal SECTOR_START and the signal FRAME_START are shown. After receiving the write data, the ECC circuit 142 generally performs the error encoding and creates the ECC block 100. The ECC circuit 142 may continuously send out the ECC block 100 sector by sector until the write process is terminated. For every sector, the ECC circuit 142 may generate a sector start pulse 160 in the signal SECTOR_START. For the frames in the ECC block 100, the ECC circuit 142 may generate frame synchronization pulses 162a-162n in the signal FRAME_START, one frame synchronization pulse at the beginning of each frame.

Figure 8:
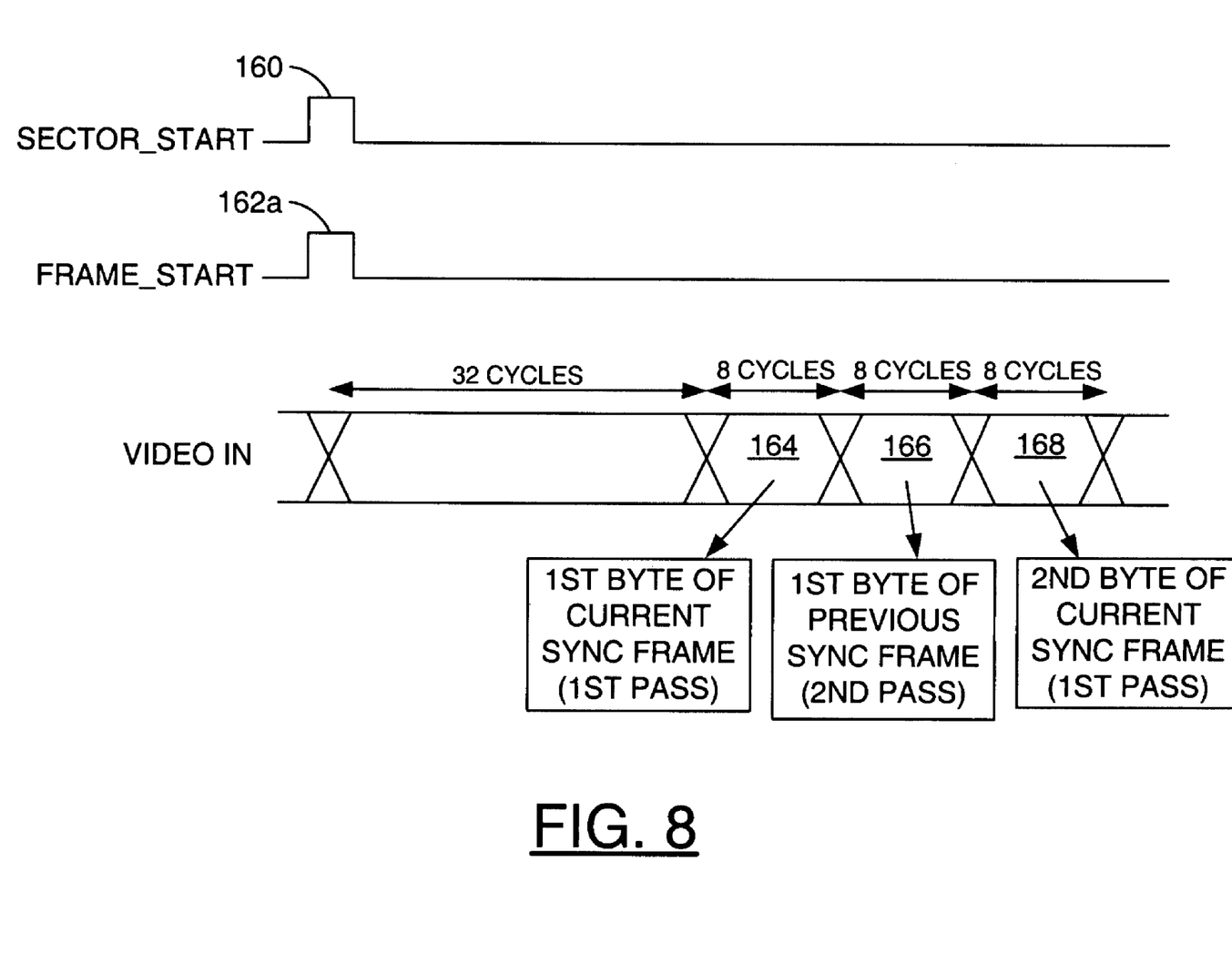
FIG. 8 is a diagram of example waveforms for interlaced error correction coded blocks.

Referring to FIG. 8, a diagram of example waveforms for interlaced ECC blocks are shown. On receiving a current sector start pulse, the EFM modulation circuit 144 may being the modulation on a current ECC block. For every 1488 clock cycles (e.g., 1488=(91 bytes/data×8 bits/byte×2 interlaced ECC blocks of data+32 leading bits)×1 clock cycle/bit), the ECC circuit 142 may generate a sector start pulse 160 and a frame synchronization pulse 162a at a first clock cycle. Beginning at predetermined (e.g., 33rd) clock cycle and for every subsequent predetermined (e.g., 16) clock cycles, the ECC circuit 142 generally transfers the video data byte 164 of a current sync frame in 8 clock cycles (first pass). The ECC circuit 142 may then transfer a video data byte 166 of a previous sync frame in the next 8 clock cycles (second pass). Repeating for subsequent video data bytes, the ECC circuit 142 may present a second video data byte 168 for the current sync frame, followed by a second video data bytes (not shown) for the previous sync frame, and so on.

In the 16 clock cycles available for every data byte pair, the EFM modulation circuit 144 generally first processes the video data byte of the current sync frame (first pass) in the first 8 clock cycles to select the conversion table, 16-bit codeword, update the DSV, polarity, next state and perform the duplication between two streams, if necessary. The EFM modulation circuit 144 may then process a video data byte of the previous sync frame (second pass) in the last 8 clock cycles using the stored decisions to generate a 16-bit codeword. The EFM modulation circuit 144 may present valid 16-bit codewords after the first previous sync frame has been processed. In other embodiments, the processing sequence of current frame first pass then previous frame second pass may be reversed.

Figure 9:
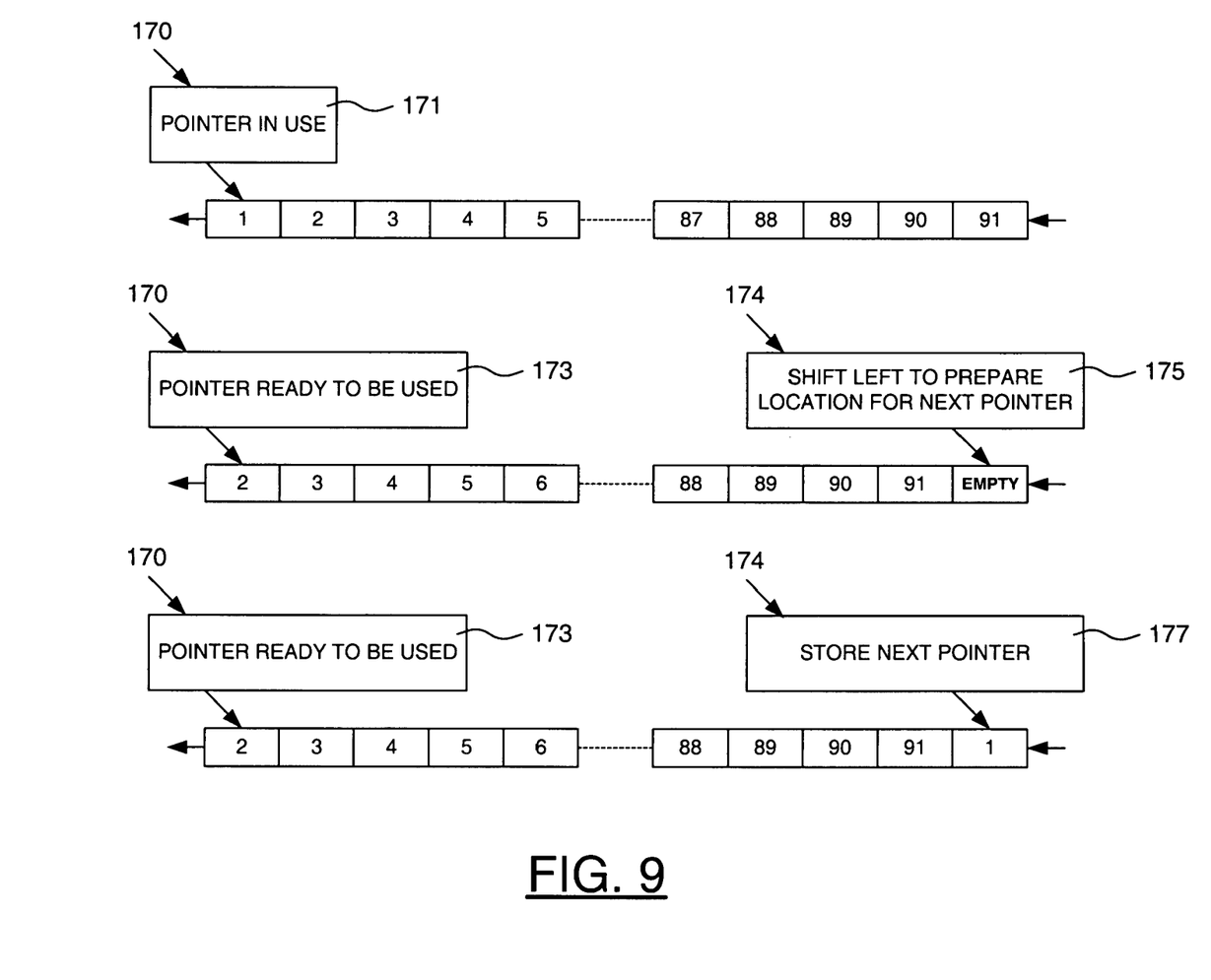
FIG. 9 is a diagram showing an example use of pointers for an interlaced first pass decision and second pass modulation.

Referring to FIG. 9, a diagram showing an example use of pointers for an interlaced first pass decision and second pass modulation is shown. Registers may be used to store the decisions (e.g., pointers) determined during the first pass. The registers may be implemented as first-in first-out (FIFO) devices. After a stored decision is used in the second pass, the registers may be shifted one position to make the next stored decision available at an output end of the FIFO and an empty place at an opposite end of the FIFO available for the new decision. For example, a first register 170 may contain a decision (pointer) 171 for a first data byte in a previous ECC block (e.g., number 1 of 91 blocks) undergoing the second pass. After the pointer 171 has been used, the register FIFO may be advanced so that a pointer 173 ready to be used for a second data byte (e.g., number 2) may be advanced into the first register 170. A last pointer that was in a last register 174 in the register FIFO may be shifted and may remain associated with the last data byte (e.g., number 91). Thereafter, the last register 174 in the register FIFO may store a default or empty pointer 175. During first pass processing of a next frame, a pointer 177 may be stored in the last register 174 pointing to a calculated decision for the first data byte (e.g., number 1) in the next frame. When the pointer 177 reaches the first register 170, the pointer 177 may be used in the second pass through the next frame. As such, the register FIFO may simultaneously store pointers used in a second pass of a first block and store pointers calculated in a first pass of a second block.

Figure 10:
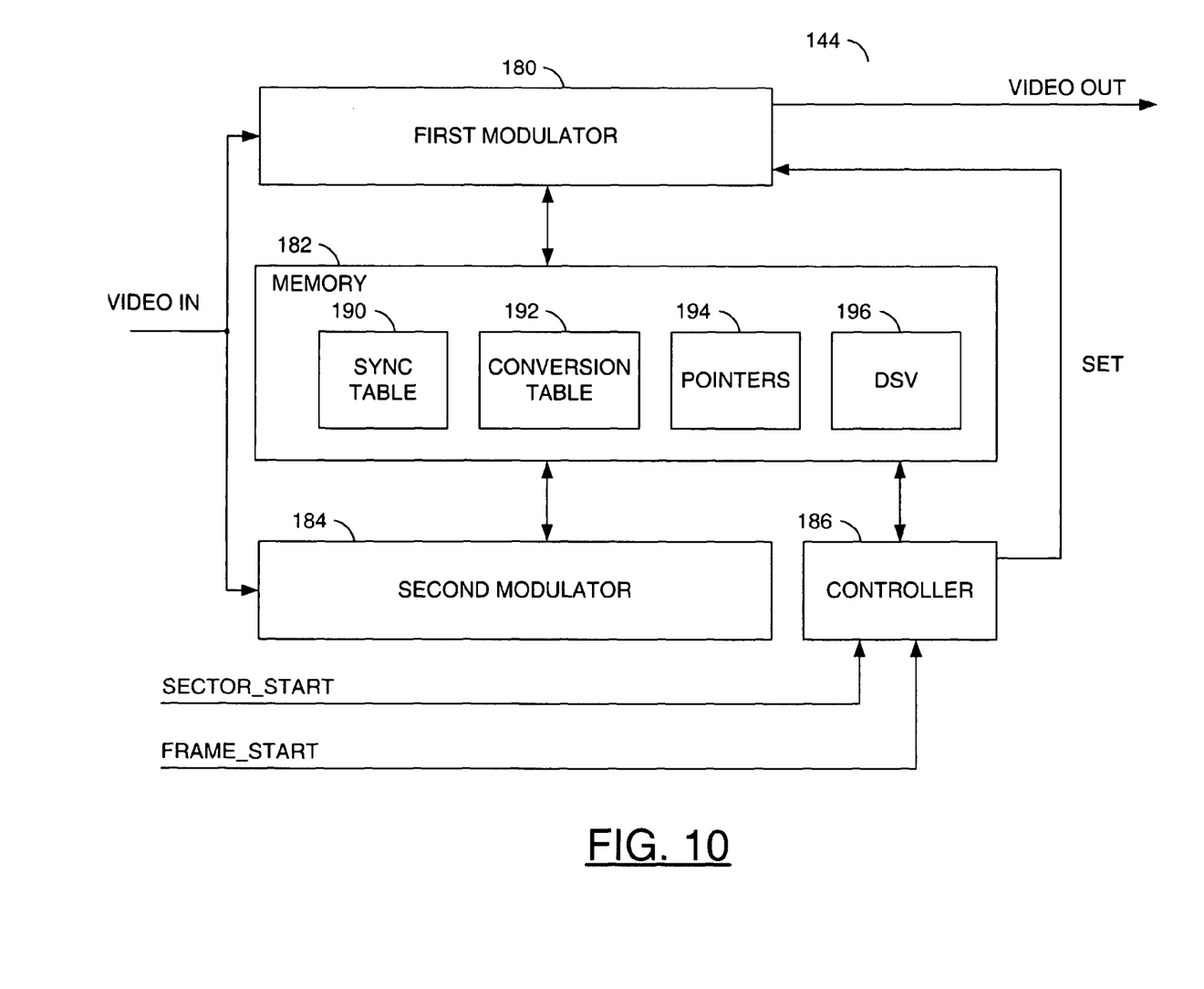
FIG. 10 is a block diagram of an example implementation of an eight-to-sixteen modulator circuit.

Referring to FIG. 10, a block diagram of an example implementation of the EFM modulation circuit 144 is shown. The EFM modulation circuit 144 generally comprises a circuit (or module) 180, a circuit (or module) 182, a circuit (or module) 184 and a circuit (or module) 186. The signal VIDEO IN may be received by both circuits 180 and 184. The signal SECTOR_START may be received by the circuit 186. The signal FRAME_START may also be received by the circuit 186. The signal VIDEO OUT may be generate by the circuit 180. A signal (e.g., SET) may be generated by the circuit 186 and presented to the circuit 180.

The circuit 182 may be referred to as a memory circuit. The memory circuit may be implemented, for example, as a random access memory and/or a set of registers. The memory circuit 182 may be used to store the synchronization tables 190, the conversion tables 192, the pointer sets 194 for both streams (e.g., register FIFOs) and the calculated DSV values 196 for both streams. In other embodiments, the pointer sets 194 may be stored in a dedicated set of registers (not shown) apart form the memory circuit 182.

The circuit 180 may be referred to as a first modulator circuit. The first modulator circuit 180 may be operational to perform the first modulation pass on the data received in the signal VIDEO IN. During the first modulation pass, the fist modulator circuit 180 may generate the pointers for the STREAM 1 and generate the DSV value for the STREAM 1. The pointers and DSV values may be stored in the memory circuit 182.

The first modulator circuit 180 may also be operational to perform the second modulation pass on the data received a second time in the signal VIDEO IN. During the second modulation pass, the circuit 180 may use the pointer set identified in the signal SET.

The circuit 184 may be referred to as a second modulator circuit. The second modulator circuit 184 may be operational to perform the first modulation pass on the data received in the signal VIDEO IN. During the first modulation pass, the second modulator circuit 184 may generate the pointers for the STREAM 2 and generate the DSV value for the STREAM 2. The pointers and DSV values may be stored in the memory circuit 182.

The circuit 186 may be referred to as a controller circuit. The controller circuit 186 may be operational to control sequencing in the EFM modulation circuit 144. The controller circuit may receive the signals SECTOR_START and FRAME_START to provide internal timing and switching for the first modulation pass and the second modulation pass. The controller circuit 186 may compare the DSV values 196 at the end of the first modulation pass to determine the better stream. The controller circuit 186 may also be operational to generate the signal SET to indicate to the first modulator circuit 180 which of the two pointer sets should be used during the second modulation pass.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

The function performed by the block diagrams of FIGS. 5 and 10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMS, EEPROMS, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for modulating a video input signal received into a modulation circuit, comprising the steps of:
   (A) during a first modulation pass, generating (i) a primary frame by inserting a plurality of primary synchronization codes into said video input signal, (ii) a secondary frame by inserting a plurality of secondary synchronization codes into said video input signal, (iii) a plurality of first values and a first digital sum value both for said primary frame and (iv) a plurality of second values and a second digital sum value both for said secondary frame; and
   (B) during a second modulation pass, generating a video output signal presented from said modulation circuit by modulating said video input signal using one set of (i) said first values and (ii) said second values as determined by said first digital sum value relative to a second digital sum value.

2. The method according to claim 1, wherein generating said first digital sum value comprises the sub-steps of:
   incrementing said first digital sum value for each of a plurality of bits in said primary frame between a first logic transition and a second logic transition; and
   decrementing said first digital sum value for each of said bits between said second logic transition and a third logic transition in said primary frame.

3. The method according to claim 1, further comprising the step of:
   storing both (i) said first values and (ii) said second values during said first modulation pass.

4. The method according to claim 3, wherein each of said first values has fewer bits than each of a plurality of codewords in said primary frame.

5. The method according to claim 4, wherein each of said first values has no greater than 20 percent as many bits as one of said codewords.

6. The method according to claim 1, further comprising the step of:
   buffering said video input signal external to said modulation circuit between said first modulation pass and said second modulation pass.

7. The method according to claim 1, wherein each of said first values comprises a 3-bit value for a respective byte in said video input signal.

8. The method according to claim 1, wherein each of said first values and each of said second values point to a unique one of a plurality of conversion tables used to modulate said video input signal.

9. The method according to claim 1, further comprising the step of:
   generating a write signal by a non-return to zero inverted conversion said video output signal.

10. The method according to claim 9, further comprising the steps of:
    buffering said video input signal in an error correction coding circuit;
    receiving a start signal at said modulation circuit to synchronize said video input signal for said first modulation pass; and
    receiving said start signal at said modulation circuit to synchronize said video input signal for said second modulation pass, wherein said second modulation pass comprises an eight-to-sixteen modulation.

11. A system comprising:
    a primary modulator configured to generate (i) a primary frame by inserting a primary synchronization, code into a video input signal, (ii) a plurality of first values for said primary frame, (iii) a first digital sum value for said primary frame and (iv) a video output signal by modulating said video input signal using one set of (a) said first values and (b) a plurality of second values as determined by said first digital sum value relative to a second digital sum value; and
    a secondary modulator configured to generate (i) a secondary frame by inserting a secondary synchronization code into said video input signal, (ii) said second values for said secondary frame, (ii) said second digital sum value for said secondary frame.

12. The system according to claim 11, wherein (i) said first values and said second values are generated based upon a first reception of said video input signal and (ii) said video output signal is generated based upon a second reception of said video input signal.

13. The system according to claim 11, further comprising a memory configured to store said first values, said second values, said first digital sum value and said second digital sum value.

14. The system according to claim 13, further comprising an error correction circuit coupled to both said primary modulator and said secondary modulator and configured to transfer said video input signal to said primary modulator and said secondary modulator.

15. The system according to claim 14, wherein said error correction circuit is further configured to interlace a current block of error correction coded data and a previous block of error correction coded data in said video input signal.

16. The system according to claim 13, further comprising a controller coupled to both said memory and said primary modulator and configured to identify said one set based on said first digital sum value and said second digital sum value.

17. The system according to claim 16, wherein said controller is further configured to generate a set signal to said primary modulator indicating said one set to use in generating said video output signal during a second modulation pass.

18. The system according to claim 13, wherein said first values and said second values together consume no greater than 546 bits in said memory.

19. The system according to claim 11, further comprising a conversion circuit coupled to said primary modulator and configured to generate a write signal by a non-return to zero inverted conversion of said video output signal.

20. A system comprising:

means for error correction coding a video input signal; and means for generating (A) during a first modulation pass (i) a primary frame by inserting a plurality of primary synchronization codes into said video input signal, (ii) a secondary frame by inserting a plurality of secondary synchronization codes into said video input signal, (iii) a plurality of first values and a first digital sum value for said primary frame and (iv) a plurality of second values and a second digital sum value both for said secondary frame and (B) during a second modulation pass generating a video output signal by modulating said video input signal using one set of (i) said first values and (ii) said second values as determined by said first digital sum value relative to said second digital sum value.

* * * * *